United States Patent
Richardson et al.

(10) Patent No.: US 8,781,496 B2
(45) Date of Patent: Jul. 15, 2014

(54) METHODS AND APPARATUS FOR MOBILE DEVICE LOCATION DETERMINATION

(75) Inventors: Thomas Richardson, South Orange, NJ (US); Aleksandar Jovicic, Jersey City, NJ (US); Cyril Measson, Somerville, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 13/008,959

(22) Filed: Jan. 19, 2011

(65) Prior Publication Data

US 2012/0184286 A1 Jul. 19, 2012

(51) Int. Cl.
*H04W 24/00* (2009.01)
*H04W 64/00* (2009.01)
*H04W 4/02* (2009.01)
*H04W 24/10* (2009.01)

(52) U.S. Cl.
CPC .............. *H04W 64/00* (2013.01); *H04W 4/027* (2013.01); *H04W 24/10* (2013.01); *H04W 4/023* (2013.01); *H04W 4/028* (2013.01); *H04M 2242/30* (2013.01)
USPC ... 455/456.2; 455/41.2; 455/41.3; 455/456.1; 455/456.3; 455/456.4; 455/456.5; 455/456.6; 455/457

(58) Field of Classification Search
CPC ..... H04W 64/00; H04W 4/027; H04W 24/10; H04W 4/023; H04W 4/028; H04M 2242/30
USPC .............................. 455/41.2, 41.3, 456.1–457
See application file for complete search history.

(56) References Cited

U.S. PATENT DOCUMENTS

| 6,026,304 | A  | * | 2/2000 | Hilsenrath et al. ......... 455/456.2 |
| 7,383,051 | B2 | * | 6/2008 | Spain et al. ................ 455/456.1 |
| 2002/0055362 | A1 | * | 5/2002 | Aoyama ....................... 455/456 |
| 2002/0102989 | A1 |   | 8/2002 | Calvert et al. |
| 2003/0050077 | A1 |   | 3/2003 | Takeuchi et al. |

(Continued)

FOREIGN PATENT DOCUMENTS

| WO | 0243428 A1 | 5/2002 |
| WO | 2007001660 A2 | 1/2007 |

OTHER PUBLICATIONS

International Search Report and Written Opinion—PCT/US2012/021457—ISA/EPO—May 22, 2012.

*Primary Examiner* — Kwasi Karikari
*Assistant Examiner* — Jaime Holliday
(74) *Attorney, Agent, or Firm* — James K. O'Hare

(57) ABSTRACT

Methods and apparatus for resolving an ambiguity with regard to a mobile device's location are described. In various embodiments, when a level of ambiguity with regard to the location of a mobile device is detected, and the level of ambiguity is above a threshold, an ambiguity resolution request signal is generated and transmitted. In this manner, a wireless terminal needing help in determining its location reliably may request such help but at other times may determine its own location without assistance. In some embodiments the ambiguity resolution request signal includes information, e.g., location probabilities, on one or more locations which are under consideration as possible locations of the mobile device. A device responding to the ambiguity resolution request provides information allowing the mobile device confronted with a location ambiguity to eliminate at least on location under consideration or to generate a new probability for one or more locations under consideration.

20 Claims, 8 Drawing Sheets

(56) References Cited

U.S. PATENT DOCUMENTS

| | | |
|---|---|---|
| 2003/0139188 A1* | 7/2003 | Chen et al. .................... 455/456 |
| 2007/0149216 A1* | 6/2007 | Misikangas ................ 455/456.1 |
| 2007/0247366 A1* | 10/2007 | Smith et al. .................... 342/464 |
| 2007/0275730 A1 | 11/2007 | Bienas et al. |
| 2008/0154542 A1 | 6/2008 | Hsyu et al. |
| 2009/0011779 A1 | 1/2009 | MacNaughtan et al. |
| 2009/0069032 A1 | 3/2009 | Rowland et al. |
| 2009/0170528 A1 | 7/2009 | Bull et al. |
| 2009/0264136 A1 | 10/2009 | Ische et al. |
| 2009/0280829 A1* | 11/2009 | Feuerstein ................ 455/456.1 |
| 2009/0312035 A1* | 12/2009 | Alizadeh-Shabdiz ..... 455/456.1 |

* cited by examiner

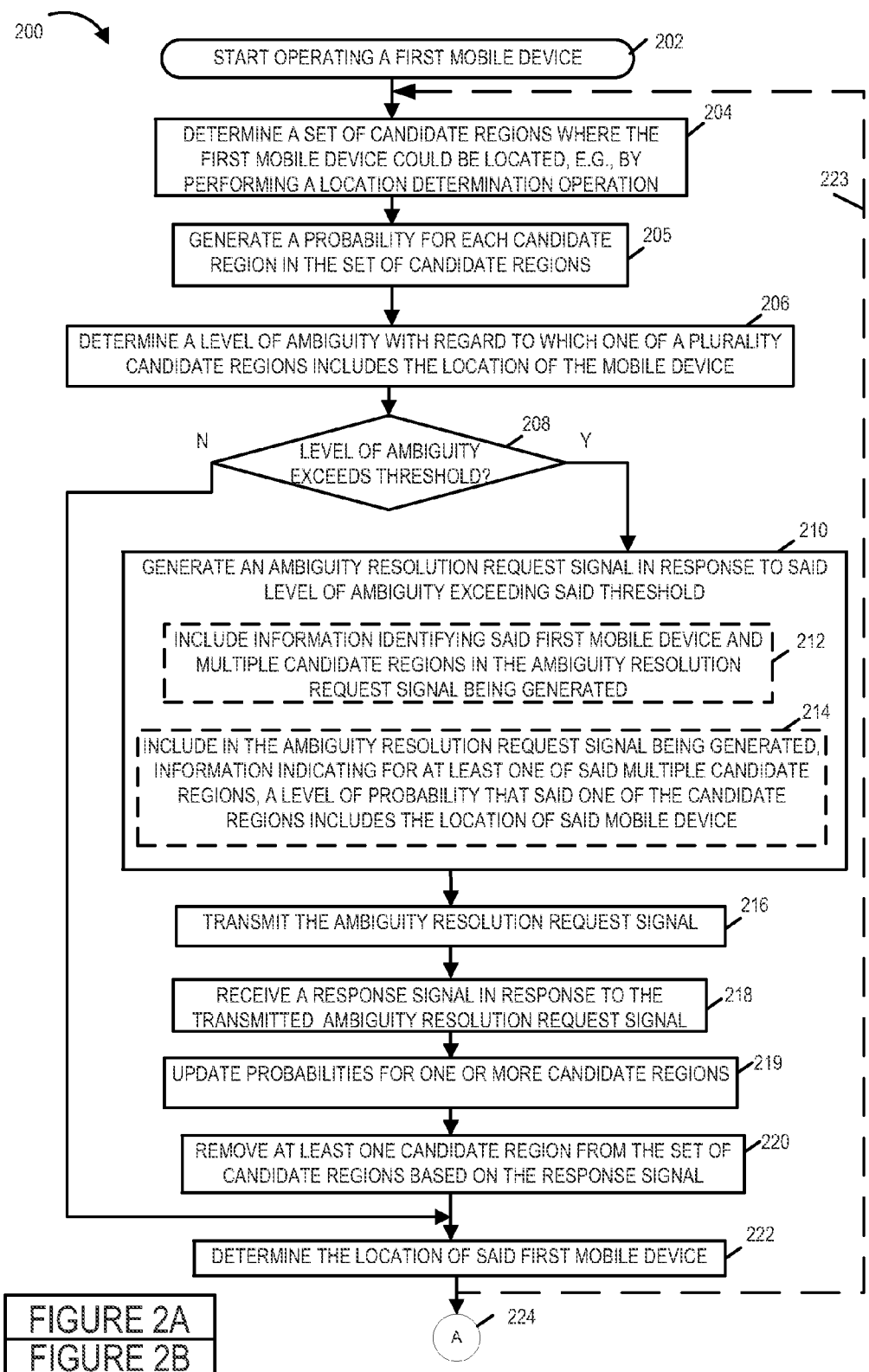

| DETERMINED CANDIDATE REGIONS | CASE 1 DETERMINED CORRESPONDING PROBABILITIES | CASE 2 DETERMINED CORRESPONDING PROBABILITIES | CASE 3 DETERMINED CORRESPONDING PROBABILITIES |
|---|---|---|---|
| CANDIDATE REGION 1 | P1 = .9 = 90% | P1 = .4 = 40% | P1 = .9 = 90% |
| CANDIDATE REGION 2 | P2 = .7 = 70% | P2 = .3 = 30% | P2 = .85 = 85% |
| CANDIDATE REGION 3 | P3 = .1 = 10% | P3 = .1 = 10% | P3 = .1 = 10% |
| | DETERMINED AMBIGUITY = 6 | DETERMINED AMBIGUITY = 16 | DETERMINED AMBIGUITY = 21 |

METHODS AND APPARATUS FOR MOBILE DEVICE LOCATION DETERMINATION

FIELD

Various embodiments relate to wireless communications, and more particularly, to methods and apparatus for determining mobile device location in a communications system.

BACKGROUND

Determination of a device's location is useful in supporting a wide variety of location based services and/or applications. To facilitate use of such services and applications it is desirable that the device location is determined with a reasonable degree of accuracy. Unfortunately in many situations the actual location where the mobile device is located remains ambiguous.

In a practical positioning system for mobile devices it is generally preferable that the devices determine their position passively, e.g., based on received signals without transmitting signals to other devices. Passive operation can save power and communication resources. In general, the goal in such systems is to perform positioning with minimal communication with other wireless devices in order to limit battery usage and reduce the communication overhead. In practice, however, situations may arise when passive approaches leave location ambiguity, thus multiple candidate locations may be identified as possible locations of the mobile device. In such a case, a mobile device may identify two or more different possible locations and be unable to select between the different possible locations as the devices actual location with a high degree of certainty.

In view of the above, it should be appreciated that there is a need for methods and/or apparatus which would allow for a mobile device to resolve an ambiguity between different possible locations thereby facilitating an accurate location determination.

SUMMARY

Methods and apparatus related to determining location of a mobile device, and for resolving ambiguity with regard to two or more possible mobile device locations in a communications system are described.

Various aspects are directed to methods and apparatus for resolving an ambiguity with regard to a mobile device's location are described. In various embodiments, when a level of ambiguity with regard to a mobile device is detected, and the level of ambiguity is above a desired threshold, e.g., a predetermined level, an ambiguity resolution request signal is generated and transmitted. The determination of an unacceptable ambiguity in location may be made by a mobile wireless terminal which then generates and transmits the ambiguity resolution request signal. In this manner, a wireless terminal needing help in determining its location reliably may request such help but at other times may determine its own location without assistance. In some embodiments, the ambiguity resolution request signal includes information on one or more locations which are under consideration as possible location of the mobile device. The information may be probabilities determined by the mobile device suffering from the location ambiguity.

A mobile or other device responding to the ambiguity resolution request signal provides information allowing the mobile device confronted with a location ambiguity to eliminate one or more locations under consideration or provides information which allows the mobile to generate a new probability for one or more locations under consideration. The information may be a replacement probability generated by the device receiving the ambiguity resolution information, a parameter or signal value used for generating the location probability, or an indication that the device requesting resolution of the ambiguity is not at one or more of the locations under consideration by the device requesting assistance in resolving the ambiguity. Based on one or more responses to a transmitted ambiguity resolution request signal, a device is able to improve its estimate of its current location and is often able to reduce the level of ambiguity. Since ambiguity signals are transmitted in response to detection of an unacceptable level of ambiguity and not for each location determination, airlink interference is reduced as compared to other systems which rely on assistance on a regular basis as part of the location determination process. In fact, in some embodiments, devices may operate the majority of the time making location determinations based on RF prediction maps without peer assistance with ambiguity resolution signals being transmitted less than half the time and in some cases, much less than half the time, e.g., less than 10% of the time. Thus, during some periods of time location determination is made without peer assistance and at other times, e.g., in response to detecting an unacceptable level of location ambiguity, peer assistance may be requested.

One aspect is directed to an exemplary method of operating a first mobile communications device, in accordance with some embodiments, comprises: determining that a level of ambiguity with regard to which one of a plurality of candidate regions includes the location of the first mobile device exceeds a threshold; generating an ambiguity resolution request signal, in response to said level of ambiguity exceeding said threshold; and transmitting the ambiguity resolution request signal.

An exemplary first mobile communications device, in accordance with some embodiments, comprises: at least one processor configured to: determine that a level of ambiguity with regard to which one of a plurality of candidate regions includes the location of the first mobile device exceeds a threshold; generate an ambiguity resolution request signal, in response to said level of ambiguity exceeding said threshold; and transmit the ambiguity resolution request signal. The exemplary first mobile communications device further comprises memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
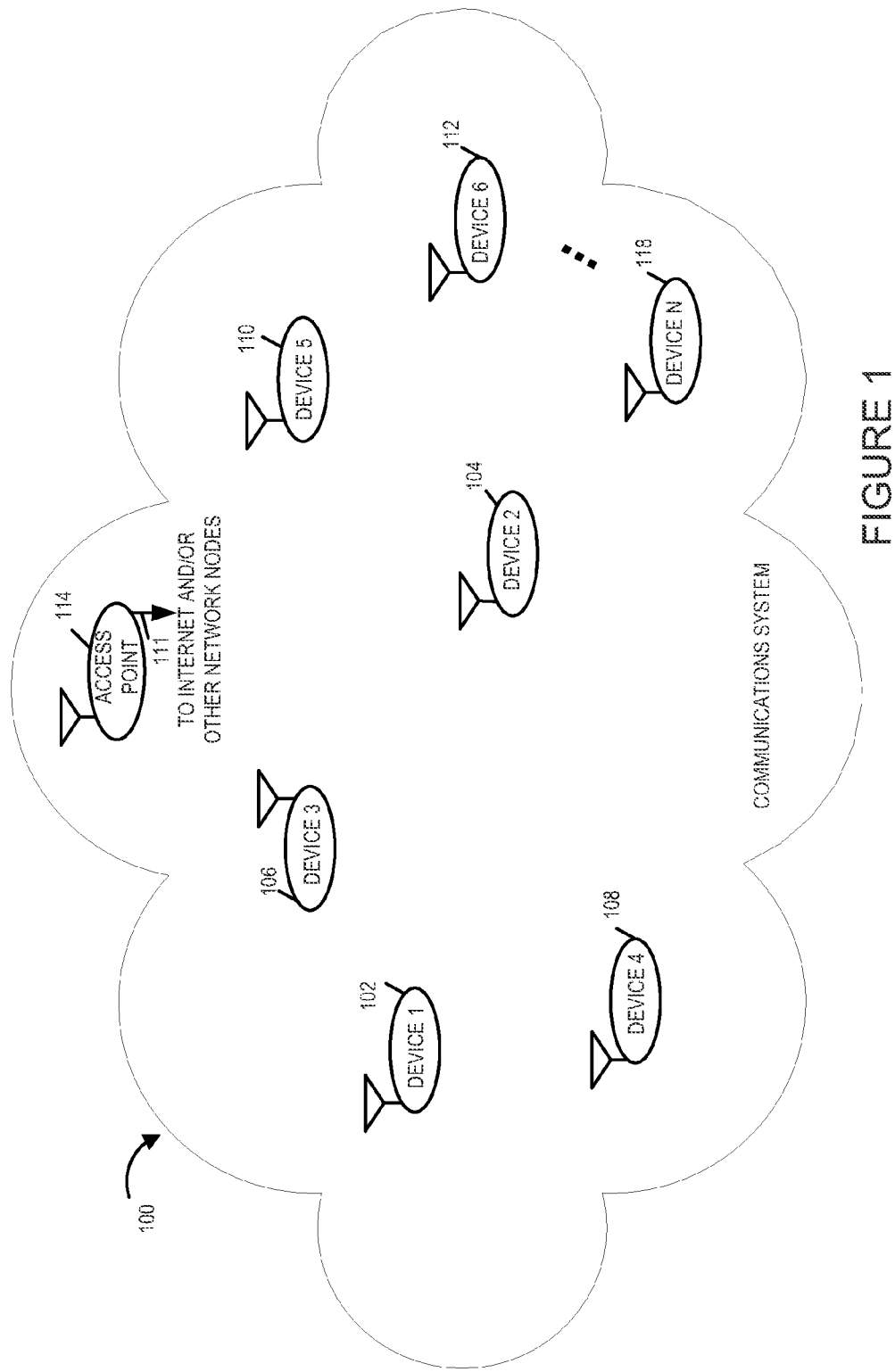
FIG. 1 illustrates an exemplary wireless communications system, e.g., peer to peer wireless communications system, in accordance with an exemplary embodiment.

FIG. 1 is a drawing of an exemplary wireless communication system 100, e.g., a peer to peer communications system, in accordance with an exemplary embodiment. Exemplary wireless communications system 100 includes a plurality of wireless mobile communications devices, e.g., peer to peer devices, including mobile device 1 102, mobile device 2 104, mobile device 3 106, mobile device 4 108, mobile device 5 110, mobile device 6 112, . . . , mobile device N 118. The communications system 100 also includes one or more access points (APs), e.g., base stations, such as access point 114. The access point 114 in some embodiments, is a fixed location device and includes a wireless interface which supports peer to peer signaling protocol in addition to other wireless signaling protocols, and a wired interface providing coupling to a backhaul network. The access point 114 is sometimes also referred to as an anchor point or location anchor point. The AP 114 may communicate with various mobile communications devices in the system, e.g., via a wireless link, and may transmit its location or its location may be known to the wireless mobile communications devices in the system. The AP 114 provides access to the Internet and/or other network nodes, via a wired or fiber network connection 111. Various wireless communications devices in system 100, e.g., device 1 102, device 2 104, device 3 106, device 4 108, device 5 110, device 6 112 and device N 118, are mobile wireless devices, e.g., handheld mobile devices. The wireless mobile communications devices support peer to peer communications, e.g., mobile wireless communications devices may communicate directly without having to communicate through another device such as access point 114.

Communications devices in system 100 may transmit and receive signals, e.g., peer discovery signals, paging signals and/or traffic data signals to/from one or more of other communications devices in the system. At various points in time a mobile device in system 100, e.g., first mobile communications device 1 102, may attempt to determine its location. Any one of various location determination techniques can be employed for the location determination operation. In some embodiments as part of the location determination process the mobile device 1 102 uses signal measurements corresponding to received signals from other devices, fingerprint predictions maps, and/or location history information received from one or more other devices. The location determination process may produce a set of candidate regions where the mobile device 1 102 could be possibly located and corresponding probability information. The probability corresponding to a candidate region is indicative of likelihood or a degree of certainty that the mobile device 1 102 is located in the candidate region. For example if a location is highly probable there is a low level of uncertainty with regard to that location. The first mobile device 1 102 when trying to determine its location may encounter, at some points in time, an unacceptable level of ambiguity, e.g., uncertainty between which of the candidate regions includes the actual location of the first mobile device 1 102. The unacceptable level of ambiguity may be, e.g., an ambiguity level above a predetermined threshold. In such a case the first mobile device 1 102 initiates an ambiguity resolution operation to resolve the location ambiguity regarding the set of candidate regions where the first mobile device 1 102 could be located.

Figure 2B:
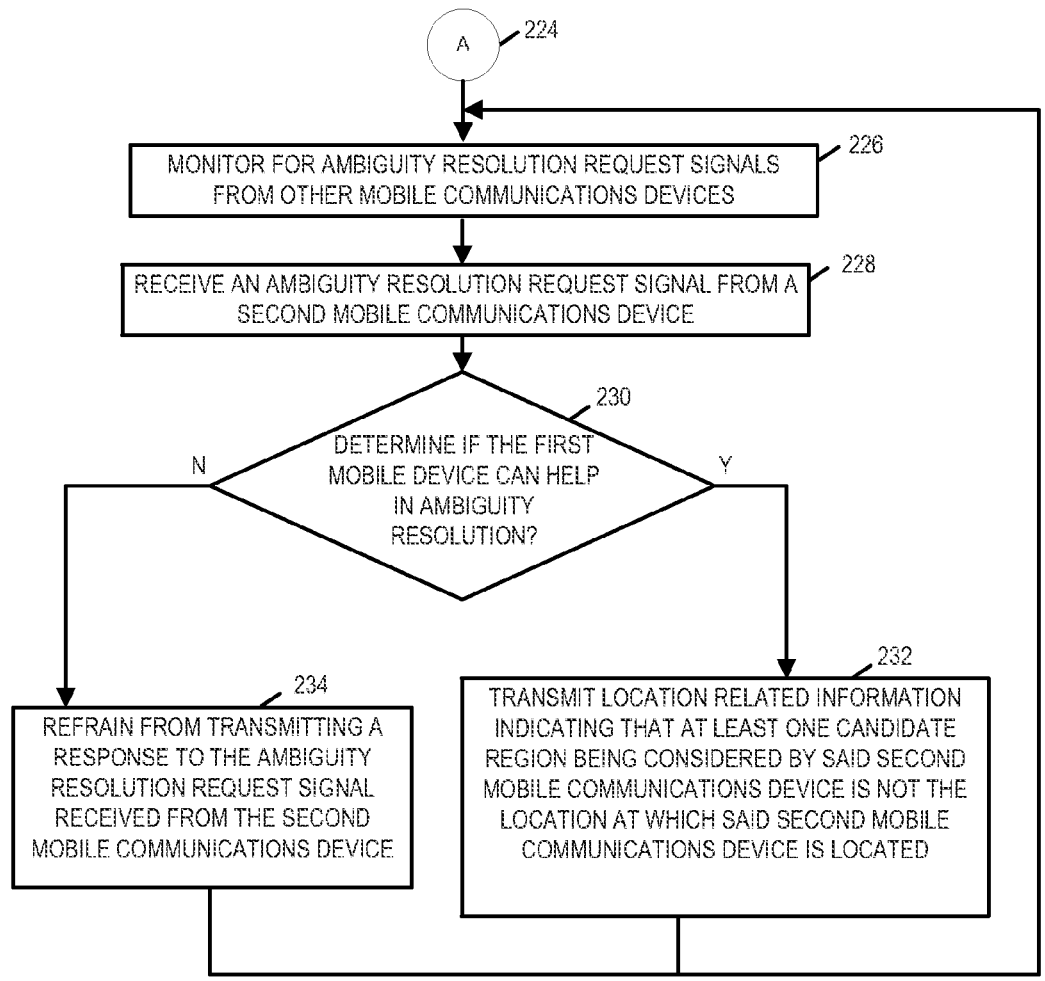
FIG. 2 which comprises the combination of FIGS. 2A and 2B, is a flowchart of an exemplary method of operating a first mobile communications device in accordance with an exemplary embodiment.

FIG. 2 which comprises the combination of FIGS. 2A and 2B, is a flowchart 200 of an exemplary method of operating a mobile communications device, in accordance with an exemplary embodiment. The mobile communications device implementing the method of flowchart 200 is, e.g., any one of the wireless mobile communications devices of system 100 of FIG. 1. For the purpose of illustration, consider that the steps shown in the exemplary method of flowchart 200 are implemented by the first mobile communications device 1 102. As will be discussed, in accordance with one feature of various embodiments, device location ambiguity, e.g., uncertainty between which of a plurality of possible device locations is the actual current location of a mobile device, can be resolved by communicating with another wireless mobile device or fixed device in order to perform an auxiliary positioning function.

The method shown in FIG. 2 starts in step 202, with the first mobile device 1 102 being powered on and initialized. Operation proceeds from start step 202 to step 204.

In step 204 the first mobile device 1 102 determines a set of candidate regions where the first mobile device 1 102 could be located. The set of candidate regions may include a plurality of regions in a particular geographic area into which a mobile device may travel. The determination of candidate regions where the mobile device could be located may be performed, for example, using location determination techniques that may use signal measurements corresponding to received signals, and/or fingerprint predictions maps etc., to determine the regions where the first mobile device 1 102 could be located or information about the geographic area in which a mobile device may travel. The set of candidate regions may include regions with a low possibility of the device being located in the region.

In step 205, a probability is generated for each of the candidate regions in the set of candidate regions. The probability indicates the probability that the first mobile device 1 102 is located in the individual candidate region to which the probability corresponds. The probabilities may be generated by using a location determination operation with regard to the candidate region. The location determination operation may be a fingerprint, e.g., RF signal detection based technique or any one of a plurality of other possible location determination techniques. While the probability information may be generated in a separate step from the step in which the set of candidate regions is determined, the two steps may be performed together. The probabilities generated in step 205 for the individual candidate regions may be generated independently in which case the sum of the probabilities for the candidate regions may exceed 100% if they were summed together.

Operation proceeds from step 205 to step 206. In step 206 the first mobile device 1 102 determines a level of ambiguity with regard to which one of a plurality of candidate regions includes the location of the mobile device. Ambiguity with regard to which of the plurality of candidate regions the mobile device is located in may be due to low probabilities being associated with the individual candidate regions. It may also be due to a small difference between two candidate regions which have similar probabilities. Regardless of the reason for the ambiguity, when a high degree of ambiguity exists it may be desirable to seek assistance from another device in resolving the ambiguity.

In some embodiments an ambiguity metric is generated indicative of a determined level of ambiguity. The ambiguity measure is compared to a threshold and if the threshold is exceeded, the mobile seeks assistance from other devices in determining its location.

In one embodiment, the ambiguity metric is based simply on the probability that the location, with the highest determined probability, is the location of the device. For example, in some embodiments, the ambiguity metric is determined by subtracting the highest determined probability from 1, where 1 represents certainty with regard to device location, and comparing that to an ambiguity threshold used as an ambiguity resolution trigger threshold.

The determined ambiguity maybe determined, e.g., as: Ambiguity=(1−Highest Location Probability in the set of current location probabilities), or a more complicated estimate of the ambiguity.

In some embodiments, the determined ambiguity is estimated based on the probability of the highest (most likely) determined location probability and the difference between at least two determined location probabilities.

In one such embodiment the Determined Ambiguity is equal to a first value times (1−the Highest Location Probability)+a second value times the inverse of the difference between at least two, e.g., the two Highest Location Probabilities).

In such a case the ambiguity may be expressed as:

$$\text{Determined Ambiguity} = A(1-\text{Highest Location Probability}) + B(1/[\text{Highest Location Probability}-\text{Second Highest Location Probability}]) \quad \{\text{Equation 1}\}$$

where A and B are control values which, in some embodiments, are ten and one, respectively. Other values for A and B are also possible.

It should be appreciated that input from another device can be useful in resolving the ambiguity between possible device locations regardless of whether that ambiguity is due to a number of low probabilities or due to multiple probabilities which are very close to each other.

Operation proceeds from step 206 to step 208 which is a determination and decision step. In step 208 it is determined whether a determined level of ambiguity (based on the determination in step 206) exceeds a threshold level, also sometimes referred to as the ambiguity resolution threshold and it is decided how the operation would proceed based on the determination. If in step 208 it is determined that the determined level of ambiguity exceeds the threshold, the operation proceeds from step 208 to step 210. If it is determined in step 208 that the level of ambiguity is not unacceptably high, e.g., not exceeding the threshold, the operation proceeds directly to step 222. Depending on a given embodiment, determination that a level of ambiguity exceeds ambiguity resolution threshold can be made in different ways.

The ambiguity resolution threshold may, and in some embodiments is, a predetermined value. In other embodiments the ambiguity resolution threshold is dynamically determined. However, in some embodiments the ambiguity threshold is dynamically determined or adjusted. In one such embodiment, the ambiguity threshold is increased, e.g., from a predetermined value, during times of high network signaling to reduce the number of ambiguity resolution signals generated and thus the amount of network interference caused by the ambiguity resolution request signals and responses. In such embodiments the ambiguity threshold may, and sometimes is, decreased in response to the device detecting a decrease in network signaling and thus network congestion. The decrease may be from a predetermined threshold level or the current ambiguity threshold level being used. In still other embodiments, a user or application can influence the ambiguity resolution threshold being used and may provide input changing the ambiguity threshold being used, e.g., to increase or decrease it depending on the accuracy needed at a particular point in time or for a particular application.

In some embodiments an ambiguity resolution operation is initiated if:

Determined Ambiguity>Ambiguity Resolution Threshold

Figure 8:
FIG. 8 is a drawing which illustrates different examples where probabilities corresponding to a set of candidate regions are used to calculate a level of ambiguity, in accordance with an exemplary embodiment.

To facilitate better understanding regarding the determination of a level ambiguity and comparison of the determined ambiguity with a threshold, consider three examples which are illustrated using drawing 800 of FIG. 8. In the following examples discussed with reference to drawing 800, it is illustrated how a level of ambiguity can be determined using the above formula (Equation 1) when a set of candidate regions and corresponding probabilities are available, e.g., have already been determined by the device attempting to determine its location, and in what situations the ambiguity resolution operation is triggered, e.g., when a given level of threshold is exceeded. For the purpose of the following three examples, assume that control value A=10, and B=1. Further assume that for these example that a predetermined threshold T=10.

In all of the three examples which are illustrated using drawing 800, consider that the first mobile device 1 102 device determines that there are 3 candidate regions where the first mobile device 1 102 device could possibly be located and each candidate region has a corresponding probability. Let the three candidate regions be Region 1, Region 2 and Region 3, and the corresponding probabilities be P1, P2 and P3 respectively.

For the first example consider that the P1=90% (Highest location probability in the set), P2=70% (Second highest location probability in the set), and P3=10%. Now using Equation 1 described above, the level of ambiguity can be calculated as follows:

$$\text{Determined Ambiguity} = A(1-\text{Highest Location Probability}) + B(1/[\text{Highest Location Probability}-\text{Second Highest Location Probability}])$$

$$\Rightarrow \text{Determined Ambiguity} = 10(1-0.9) + 1(1/[0.90-0.70])$$

$$\Rightarrow \text{Determined Ambiguity} = 10(0.1) + 1(5)$$

$$\Rightarrow \text{Determined Ambiguity} = 6$$

Now comparing the determined level of ambiguity with the predetermined threshold (T=10), we determine that in this example (case 1) the determined level of ambiguity is below the set threshold and thus ambiguity resolution operation is not desirable. Since the condition for triggering of the ambiguity resolution operation, i.e., Determined Ambiguity>Ambiguity Resolution Threshold, is not satisfied the ambiguity resolution processing does not start and in such cases the operation proceeds from step 208 directly to step 222.

Consider a second example, where probabilities corresponding to the 3 determined candidate regions are as follows:

P1=40% (Highest location probability in the set), P2=30% (Second highest location probability in the set), and P3=10%. Now using Equation 1 described above, the level of ambiguity can be calculated as follows:

Determined Ambiguity= $A$(1−Highest Location Probability) +

$B$(1/[Highest Location Probability−

Second Highest Location Probability)

=> Determined Ambiguity= 10(1−0.4) + 1(1/[0.40−0.30])

=> Determined Ambiguity= 10(0.6) + 1(10)

=> Determined Ambiguity= 16

Now comparing the determined level of ambiguity with the predetermined threshold (T=10), it is clear that in this example (case 2) the determined level of ambiguity is above the threshold level as Determined Ambiguity (16)>Predetermined threshold (10), and thus ambiguity resolution operation is desirable in order to resolve location ambiguity and/or to determine correct location. Thus in such a case the ambiguity resolution is triggered and operation proceeds from step 208 to step 210.

Consider a third example, where probabilities corresponding to the 3 determined candidate regions are as follows:

P1=90% (Highest location probability in the set), P2=85% (Second highest location probability in the set), and P3=20%. Now using Equation 1 described above, the level of ambiguity can be calculated as follows:

Determined Ambiguity= $A$(1−Highest Location Probability) +

$B$(1/[Highest Location Probability−

Second Highest Location Probability)

=> Determined Ambiguity= 10(1−0.9) + 1(1/[0.90−0.85])

=> Determined Ambiguity= 10(0.1) + 1(1/[0.05] = 1 + 20

=> Determined Ambiguity= 21

Now comparing the determined level of ambiguity with the predetermined threshold (T=10), it is clear that in this example (case 3) the determined level of ambiguity is above the threshold level as Determined Ambiguity (21)>Predetermined threshold (10), and thus ambiguity resolution operation is desirable in order to resolve location ambiguity. Thus in such a case the ambiguity resolution is triggered and operation proceeds from step 208 to step 210.

In various embodiments an ambiguity metric, indicative of a determined level of position ambiguity, is compared with a threshold. The ambiguity metric may vary depending on the particular embodiment. The result of the comparison, in many embodiments, is used to determine if criteria for triggering a position ambiguity resolution operation is satisfied. In some embodiments the criteria for triggering a position ambiguity resolution operation is that the generated ambiguity metric exceeds a threshold. Thus, in some embodiments if the ambiguity metric is greater than a threshold, a position ambiguity sufficient to trigger an ambiguity resolution determination operation is determined to have occurred.

In one but not necessarily all embodiments, the ambiguity metric may be a standard deviation of the distribution of the estimated locations of the mobile device. In one such embodiment, each location in the space of interest is identified by a vector in the form (x,y,z) with respect to some a priori chosen point of reference, e.g., the center of a floor of a building or some other fixed locations. In such a case the N highest probability estimated locations may be represented by the vectors $\{(x\_1,y\_1,z\_n), (x\_2,y\_2,z\_2), \ldots, (x\_N,y\_N,z\_N)\}$, respectively and their corresponding probabilities be $\{p\_1, p\_2, \ldots, p\_N\}$, respectively. Note that the locations are represented by three dimensional vectors representing locations in a three dimensional space with a single scalar probably being associated with each location vector. In such an embodiment, the mean of the N highest probability locations can be expressed, and is determined as, $m=(x\_m,y\_m,z\_m)$, where the x-coordinate $x\_m$ is the sum of $x\_i*p\_i$, the y-coordinate $y\_m$ is the sum of $y\_i*p\_i$ and the z-coordinate is the sum of $z\_i*p\_i$, for i from 1 to N. The standard deviation, then, in such an embodiment, is defined and determined as the square root of the sum of $p\_i*\{(x\_i-x\_m)^2+(y\_i-y\_m)^2+(z\_i-z\_m)^2\}$, for i from 1 to N. The standard deviation determined in the above described manner is what is compared, in some embodiments, to the threshold to determine if an ambiguity resolution operation should be initiated, e.g., in response to the standard deviation exceeding a predetermined or dynamically generated threshold.

In another embodiment, the ambiguity metric, i.e., the value compared to the threshold used to trigger an ambiguity resolution operation, may be and sometimes is, the moment around the highest probability location. In such an embodiment, the metric is defined as, and determined by calculating, the sum of $(p\_i/p\_h)*\{(x\_i-x\_h)^2+(y\_i-y\_h)^2+(z\_i-z\_h)^2\}$, where $(x\_h,y\_h,z\_h)$ is the location with the highest probability, $p\_h$, out of the set of N highest probability locations $\{(x\_1,y\_1,z\_n), (x\_2,y\_2,z\_2), \ldots, (x\_N,y\_N,z\_N)\}$.

In still other embodiments, the ambiguity metric that is compared to the threshold used to determine if an ambiguity resolution operation should be triggered, may be and sometimes is, one that takes into account the topology of a floor map or other map being used to determine device location. For instance, consider that even if the highest probability locations are close together, they may be in different rooms of the floor so the ambiguity metric should be higher in such a case. One way to incorporate this into the above metric, which is used in some embodiments, is to introduce an additional penalty to the above described metric before comparing it to the threshold. For example, if the position $(x\_i,y\_i,z\_i)$ and $(x\_m,y\_m,z\_m)$, in the standard deviation based embodiment discussed above, or $(x\_h, y\_h,z\_h)$, in the moment based embodiment discussed above, are in different "meta locations", a penalty may be applied prior to comparing the generated metric to the threshold. Where floor based maps are used for location determination, different rooms of a floor may correspond to different metalocations. In one such embodiment, the ambiguity metric which is compared to the threshold is the sum, over i=1, 2, ..., N, of $p\_i*\{(x\_i-x\_m)^2+(y\_i-y\_m)^2+(z\_i-z\_m)^2\}+f((x\_i,y\_i,z\_i),(x\_m,y\_m,z\_m))$, where $f((x\_i,y\_i,z\_i),(x\_m,y\_m,z\_m))=0$ if $(x\_i, y\_i,z\_i)$ and $(x\_m,y\_m,z\_m)$ are in the same meta location and, say a constant value of A (where A=10 in some embodiments) is used if they are in a different meta locations.

Returning now to step 210. In step 210 the first mobile device 1 102 initiates to resolve location ambiguity and generates an ambiguity resolution request signal in response to said level of ambiguity exceeding the threshold. In some embodiments the one or more of optional steps 212 and 214 are performed as part of step 210. In step 212 information identifying the first mobile device 1 102 and multiple candidate regions, is included in the ambiguity resolution request signal being generated. In some embodiments the information identifying the first mobile device 1 102 is, e.g., a device identifier. In step 214 information indicating for at least one of the multiple candidate regions, a level of probability that said one of the candidate regions includes the location of the first mobile device 1 102, is included in the ambiguity resolution request signal. Thus a probability indicating a degree of certainty corresponding to each of the indicated multiple candidate regions is also included in the ambiguity resolution request signal. An exemplary ambiguity resolution request signal is discussed in FIG. 6 in greater detail.

Operation proceeds from step 210 to step 216 where the generated ambiguity resolution request signal is transmitted by the first mobile device 1 102. For example in some embodiments the ambiguity resolution request signal is transmitted to a particular device, e.g., whose location is currently known, or a peer device which has been previously discovered by the first mobile device 102. The device that is selected to receive the ambiguity resolution request signal may then respond with a signal that helps in resolving the location ambiguity of the first mobile device 102.

In some other embodiments the step of transmitting includes broadcasting the ambiguity resolution request signal. It should be appreciated that in such embodiments by broadcasting rather than addressing or communicating the ambiguity resolution request signal to a specific device, valuable air link resources can be conserved by avoiding multiple transmissions to individual devices. Various communications devices which are in the broadcast transmission range can hear the broadcast ambiguity resolution request signal and respond if they can help in resolving the device location ambiguity. In accordance with one aspect, the ambiguity regarding the device location is resolved by communicating with another wireless mobile device or a fixed device in order to perform auxiliary positioning operation. The communications devices which receive the broadcast ambiguity resolution request signal may decide to help resolve the ambiguity if they consider that they have useful information that can help in resolving the location ambiguity. Communications devices which do not have such useful information remain silent.

Operation proceeds from step 216 to step 218. In step 218 the first mobile device 1 102 receives a response signal in response to the transmitted ambiguity resolution request signal. In some embodiments the received response signal is from another device, e.g., a mobile communications device, e.g., device 3 106, which received the transmitted ambiguity resolution request signal. In some embodiments the received response signal is from a fixed anchor point, e.g., AP 114, which received the transmitted ambiguity resolution request signal. In some embodiments the response signal includes information sufficient for the first mobile device 1 102 sending the request signal to exclude out one or more candidate regions from the plurality of candidate regions. An exemplary request response signal is discussed in FIG. 7 in greater detail. In one embodiment, the response signal transmitted by the responding device includes information regarding the current location of the responding device. The location information in the response signal may then be used by the first mobile device 1 102 for disambiguating and resolving the first mobile device's location ambiguity. Signal-fingerprint-based location determination techniques may be applied on the signal received from the responding communications device.

Operation proceeds from step 218 to step 219 which is optional. In step 219 the probabilities for one or more candidate regions are updated, e.g., generate new probabilities for one or more candidate regions in the set of candidate regions or update the previously determined probabilities, based on the information received in the response signal.

Operation proceeds from step 219 to step 220. In step 220 the first mobile device 1 102, following the receipt of the response message, removes at least one candidate region from the set of candidate regions based on the response signal and/or using the updated probabilities corresponding to the candidate regions indicated in, or generated using, the information included in the response signal. For example, an ambiguity resolution request signal received by the first mobile device 1 102 indicates three possible candidate regions in an office building, e.g., region 1 being 1st floor in the building, candidate region 2 being the 3rd floor in the building, and candidate region 3 being the 7th floor in the building. The responding communications device may indicate in the response signal that 3rd floor is the correct region, or that 7th floor is not a valid possible region. Thus using the information indicated in the response signal, the first mobile device 1 102 can remove at least one of the plurality of possible candidate regions and hence at least narrow down the ambiguity in possible candidate regions. In some embodiments the responding device is able to make such determination, e.g., based on the knowledge of its own location and the fact that the first mobile device 1 102 which sent the ambiguity resolution request signal is within the broadcast range of the responding device. In some embodiments the responding device can use signal measurements performed on signal(s) received from the first mobile device 1 102 (e.g., such as received signal power level) and fingerprint prediction maps to make such a determination.

In some embodiments the response message further includes information indicating updated probabilities associated with each of the candidate regions indicated in the ambiguity resolution request signal communicated by the first mobile device 1 102. Thus in some such embodiments the first mobile device 1 102 uses the updated probability information in resolving the ambiguity regarding the candidate region where the first mobile device 1 102 could be located. The ambiguity resolution process may repeat (e.g., steps 204 to 220 may repeat) when an ambiguity regarding location arises again, e.g., when the first mobile device 1 102 moves and again finds multiple possible candidate regions where it could be located when attempting to determine its location.

Operation proceeds from step 220 to step 222. In step 222 the first mobile device 1 102 determines its location included in a candidate region. Each of the candidate region includes at least one location representing the location of the mobile device 1 102 in that candidate region. Thus the location may be determined, e.g., from the remaining candidate regions and the respective updated probabilities associated with the candidate regions indicated in the response message.

Operation proceeds from step 222 to step 226 via connecting node A 224, as shown in FIGS. 2A and 2B. In step 226, the first mobile device 1 102 monitors for ambiguity resolution signals from other mobile communications devices in the system. In some embodiments the first mobile device 1 102 starts monitoring for ambiguity resolution signals from other mobile devices which are seeking to resolve device location ambiguity, only after determining its own location to a certain level of certainty, and thus ensuring to participate in an ambiguity resolution process for other devices only when it can offer help.

Operation proceeds from step 226 to step 228. In step 228 the first mobile device 1 102 receives an ambiguity resolution request signal from a second mobile communications device, e.g., device 2 104. Like the first mobile device 1 102, the second mobile communications device 2 104 may also be trying to determine its actual location by resolving device location ambiguity and therefore transmits, e.g., broadcasts, a resolution request signal indicating a plurality of candidate regions where the second mobile device 2 104 could be located. It should be appreciated that the second mobile communication device could be any one of the mobile communications devices of system 100, however for the purpose discussion mobile device 2 104 is considered to be the second mobile communications device.

Operation proceeds from step 228 to step 230. In step 230 the first mobile device 1 102 determines if it can help in resolving the location ambiguity of the second mobile device 2 104. For example, the first mobile device 1 102 may be able to help when it is aware of and confident about its own location to a certain predetermined level of accuracy. In some cases the first mobile device 1 102 may be able to help in resolving the location ambiguity based on the knowledge of its own location and the fact that the second mobile device 2 104 which sent the ambiguity resolution request signal is within the broadcast range of the first device 1 102 (e.g., when the ambiguity resolution signal was broadcast by the second mobile device 2 104). If in step 230 it is determined that the first mobile device 102 can help in the ambiguity resolution, the operation proceeds from step 230 to step 232. In step 232 the first mobile device 1 102 transmits location related information indicating that at least one candidate region being considered by said second mobile communications device 2 104 is not the location at which said second mobile communications device is located. In various embodiments the location related information is sent in a response message to the second mobile device 2 104. Thus in this manner, the first mobile device 1 102 assists the second mobile device 2 104 in resolving the location ambiguity. Operation proceeds from step 232 back to monitoring step 226 to continue monitoring for request signal from other devices.

If in step 230 it is determined that the first mobile device 102 cannot help in the ambiguity resolution, the operation proceeds from step 230 to step 234. In step 234 the first mobile device 1 102 refrains from transmitting a response message in response to the ambiguity resolution request signal received from the second mobile device 2 104. Operation proceeds from step 234 back to monitoring step 226

In some embodiments the location determination related steps of the ambiguity resolution process shown in FIG. 2, e.g., steps 204 to 222, are performed repeatedly. For example, an application running on the mobile device may seek to use device location information triggering steps 204 to 222 to be performed. In still other embodiments, the location determination process is performed periodically, e.g., with the device determining its location on a regular basis. Dashed line 223 represents the possible repeating of steps 204 through 222 which occurs in some embodiments.

While steps 226-232 relating to monitoring for ambiguity resolution request signals and responding to such signals are shown as following location determination step 222, it should be appreciated that steps 226 through 234 may occur in parallel with steps 204-222, e.g. after the mobile device performs an initial location determination.

Figure 3:
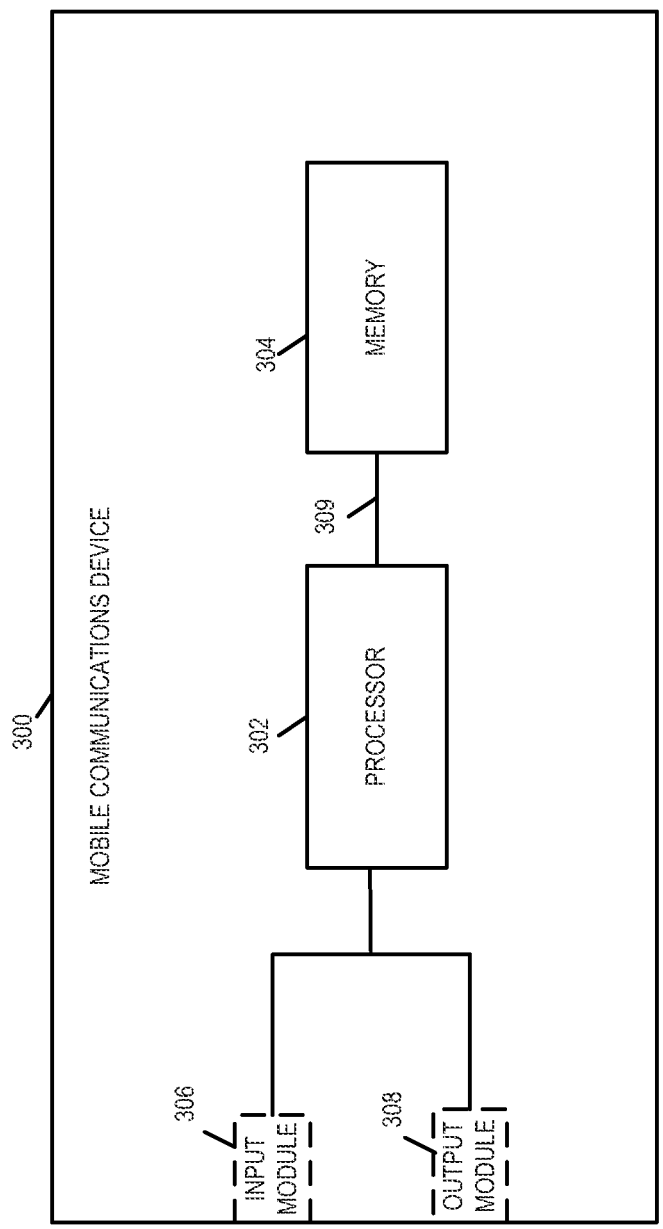
FIG. 3 is an exemplary mobile communications device in accordance with an exemplary embodiment.

FIG. 3 is a drawing of an exemplary mobile communications device 300, in accordance with an exemplary embodiment. Exemplary mobile communications device 300 may be used as any one of the wireless mobile communications devices of FIG. 1 such as the first mobile communications device 1 102. Exemplary mobile communications device 300 may, and sometimes does, implement a method in accordance with flowchart 200 of FIG. 2.

The mobile communications device 300 includes a processor 302 and memory 304 coupled together via a bus 309 over which the various elements (302, 304) may interchange data and information. The memory 304 may include an assembly of modules used to control the mobile communications device, e.g., such as the assembly of modules shown in FIG. 4. The mobile communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to determine a level of ambiguity with regard to which one of a plurality of candidate regions includes the location of the mobile device 300; determine whether the level of ambiguity with regard to which one of a plurality of candidate regions includes the location of the mobile device exceeds a threshold; generate an ambiguity resolution request signal, in response to said level of ambiguity exceeding said threshold; and transmit, e.g., broadcast, the ambiguity resolution request signal. In various embodiments the processor 302 is configured to determine a set of candidate regions where the mobile communications device 300 could be located, said set of candidate regions being the plurality of candidate regions; and generate probabilities for each candidate region in the set of candidate regions. In various embodiments the ambiguity resolution request includes information identifying the mobile device 300 and multiple candidate regions. In some embodiments the multiple candidate regions could be a subset of the plurality of candidate regions for which a level of ambiguity exceeds the threshold. In some embodiments the ambiguity resolution request signal further includes information indicating for at least one of said multiple candidate regions, a level of probability that said one of the candidate regions includes the location of the mobile device 300.

In various embodiments the processor 302 is further configured to receive a response signal in response to the transmitted ambiguity resolution request signal; update probabilities for one or more one or more candidate regions using information indicated in the received response signal; and remove at least one candidate region from the set of candidate regions based on the response signal. In some embodiments the received response signal is from another device, e.g., another mobile communications device, which received the transmitted ambiguity resolution request signal. In various embodiments the processor 302 is further configured to determine the location of the mobile device 300, e.g., following the receipt of the response signal from another communications device and after resolving the ambiguity with regard to which of the plurality of regions include the location of the mobile device 300.

Processor 302 in some embodiments is further configured to monitor for ambiguity resolution request signals from other mobile communications devices, receive an ambiguity resolution signal from a second mobile device, and determine if the mobile device 300 can help the second mobile device in ambiguity resolution. In some embodiments the processor 302 is further configured to transmit location related information indicating that at least one candidate region being considered by said second mobile communications device is not the location at which said second mobile communications device is located. In some embodiments when it is determined that the mobile device 300 cannot help the second mobile device in resolving the location region ambiguity, the processor 302 is further configured to refrain from transmitting a response to the ambiguity resolution request signal from the second mobile device.

Figure 4:
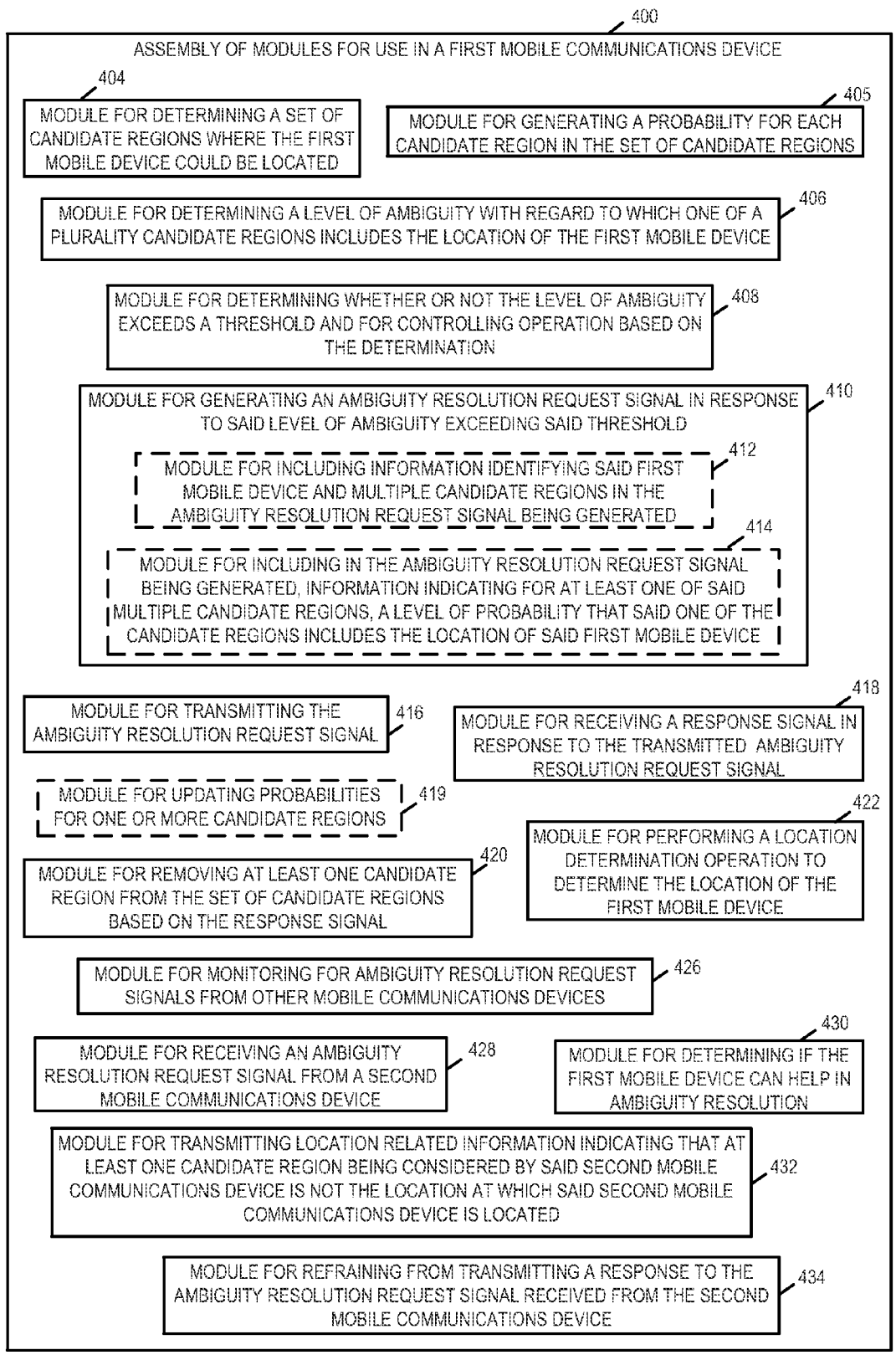
FIG. 4 is an assembly of modules which may be used in the exemplary mobile communications device of FIG. 3.

FIG. 4 illustrates an assembly of modules 400 which can, and in some embodiments is, used in a first mobile communications device such as the mobile communications device 300 illustrated in FIG. 3 or the first mobile device 1 102. The modules in the assembly 400 can be implemented in hardware within the processor 302 of FIG. 3, e.g., as individual circuits. Alternatively, the modules may be implemented in software and stored in the memory 304 of the mobile communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless mobile communications device 300 or elements therein such as the processor 302, to perform the functions of the corresponding steps illustrated and/or described in the method of flowchart 200 of FIG. 2.

The assembly of modules 400 includes a module corresponding to each step of the method of flowchart 200 shown in FIG. 2. For example module 404 corresponds to step 204 and is responsible for performing the operation described with regard to step 204. The assembly of modules 400 includes a module 404 for determining a set of candidate regions where the mobile communications device 300 could be located, a module 405 for generating a probability for each candidate region in the set of candidate regions, a module 406 for determining a level of ambiguity with regard to which one of a plurality of candidate regions includes the location of the mobile device 300, a module 408 for determining whether or not the level of ambiguity exceeds the threshold and for controlling the operation of mobile device 300 based on the determination, a module 410 for generating an ambiguity resolution request signal, in response to said level of ambiguity exceeding said threshold, and a module 416 for transmitting, e.g., broadcasting, the ambiguity resolution request signal. In various embodiments the module 410 for generating the ambiguity resolution request signal includes a module 412 for including information identifying the mobile device 300 and multiple candidate regions in the ambiguity resolution request signal, and a module 414 for including information indicating for at least one of said multiple candidate regions, a level of probability that said one of the candidate regions includes the location of the mobile device 300, in said request signal being generated. In some embodiments the multiple candidate regions could be a subset of the plurality of candidate regions for which a level of ambiguity exceeds the threshold.

In various embodiments the assembly of modules 400 further includes a module 418 for receiving a response signal in response to said transmitted ambiguity resolution request signal, a module 419 for updating probabilities of one or more candidate regions, e.g., by generating new probabilities for one or more candidate regions in the set of candidate regions or updating the previously determined probabilities, based on the information received in the response signal, and a module 420 for removing at least one candidate region from the set of candidate regions based on the response signal and/or using the updated probabilities corresponding to the candidate regions indicated in, or generated using, the information included in the response signal. In some embodiments the assembly of modules 400 further includes a module 422 for performing a location determination operation to determine the location of the mobile communications device 300, a module 426 for monitoring for ambiguity resolution request signals from other mobile communications devices, a module 428 for receiving an ambiguity resolution signal from a second mobile device, and a module 430 for determining if the mobile device 300 can help the second mobile device in ambiguity resolution. In some embodiments the assembly of modules 400 further includes a module 432 for transmitting location related information indicating that at least one candidate region being considered by said second mobile communications device is not the location at which said second mobile communications device is located, and a module 434 for refraining from transmitting a response to the ambiguity resolution request signal from the second mobile device when it is determined that the mobile device 300 cannot help the second mobile device in resolving the location region ambiguity.

Figure 5:
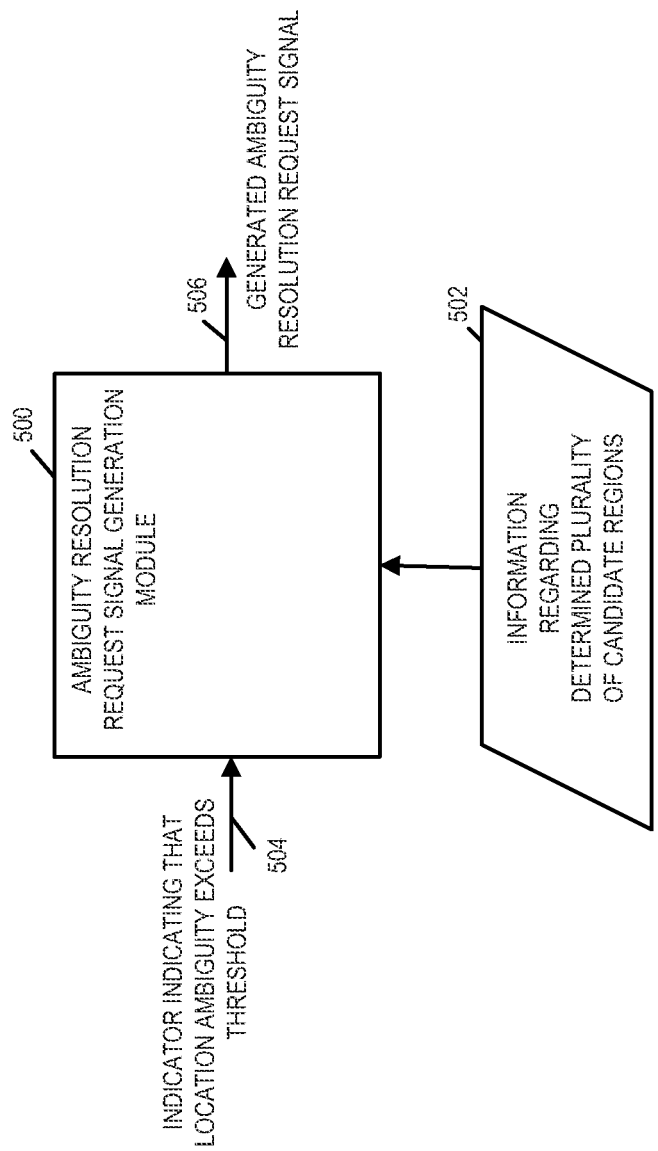
FIG. 5 illustrates an exemplary ambiguity resolution request signal generation module included in an exemplary mobile communications device.

FIG. 5 illustrates an exemplary ambiguity resolution request signal generation module 500 included in an exemplary mobile communications device, e.g., mobile device 300 (first mobile device 1 102). Ambiguity resolution request signal generation module 500 generates and outputs the ambiguity resolution request signal 506 using the information 502 regarding the determined plurality of candidate regions where the first mobile device 1 102 could be located. In some embodiments the generation of the ambiguity resolution request signal 506 is triggered by an internal signal 504 indicating that a level of ambiguity with regard to which one of a plurality of the candidate regions includes the location of the first mobile device exceeds a threshold. The internal signal 504 in some embodiments is produced by a determination module such as module 408 illustrated in FIG. 4. In some embodiments the information 502 regarding the determined plurality of candidate regions where the first mobile device 1 102 could be located, is the output of module 404 of assembly of modules 400 of FIG. 4. The information may be stored temporarily in the first mobile device 1 102 memory, e.g., memory 304, during the location determination process.

The generated request signal 506 may be stored in the first mobile device 1 102 memory, or another storage module in the first mobile device 1 102, prior to transmission. In some embodiments the ambiguity resolution request signal generation module 500 is module 410 of assembly of modules 400 of FIG. 4.

Figure 6:
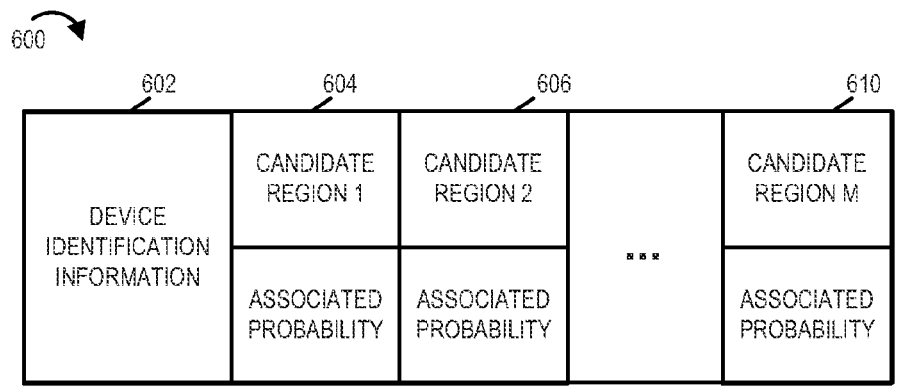
FIG. 6 illustrates an exemplary ambiguity resolution request signal including various exemplary fields of information, in accordance with an exemplary embodiment.

FIG. 6 illustrates an exemplary ambiguity resolution request signal 600 including various exemplary fields of information, in accordance with an exemplary embodiment. Exemplary ambiguity resolution request signal 600 is generated by an exemplary mobile communications device, e.g., first mobile device 1 102, seeking to resolve location ambiguity regarding which of a plurality of candidate regions actually includes the location of the first device 1 102. In some embodiments the ambiguity resolution request signal 600 is the signal 506 generated by the ambiguity resolution request signal generation module 500 of FIG. 5.

The exemplary ambiguity resolution request signal 600 includes device identification information field 602, and a plurality of fields 604, 606, . . . , 610, with each of the each information fields 604, 606, . . . , 610 indicating a candidate region where the first mobile device 1 102 could be possibly located and an associated probability indicating the likelihood that the first mobile device is located in that candidate region.

The first field 602 includes identification information identifying the first mobile device 1 102 which generated the ambiguity resolution request signal. The identification information may include, e.g., a mobile device identifier, a network assigned identifier etc. Information fields 604, 606, . . . , 610 include information indicating the possible locations which the first mobile device 1 102 believes it may be located at, and an indication of a degree of certainty corresponding to each of the possible locations, e.g., a probability. For example, in a scenario when the first mobile device 1 102 is inside a building, the different candidate regions indicated in fields 604, 606, 610 may indicate different floors in the building where the first mobile device 1 102 is possibly located. For example, candidate region 1 may be the 1st floor level, and the associated probability may be, e.g., 20%, indicating that there is a 20% certainty that the first mobile device 1 102 is located on the 1st floor level. Similarly candidate region 2 may be the 2nd floor level, and the associated probability may be, e.g., 30%, indicating that there is a 30% certainty that the first mobile device 1 102 is located on the 2nd floor, and candidate region M may be 4th floor level, and the associated probability may be, e.g., 7%, indicating that there is a 7% certainty that the first mobile device 1 102 is located on the 4th floor level. Thus in some embodiments the communications devices receiving the ambiguity resolution request signal 600 which can help in resolving the first mobile device's location ambiguity, are able to skew the probabilities in favor of one or sometimes a subset of the candidate regions indicated in the request signal 600. Such devices then respond to the first mobile device 1 102 in a response signal such as the one illustrated in FIG. 7. In some embodiments the ambiguity resolution request signal 600 is one of a peer traffic signal, a broadcast signal or a query signal.

Figure 7:
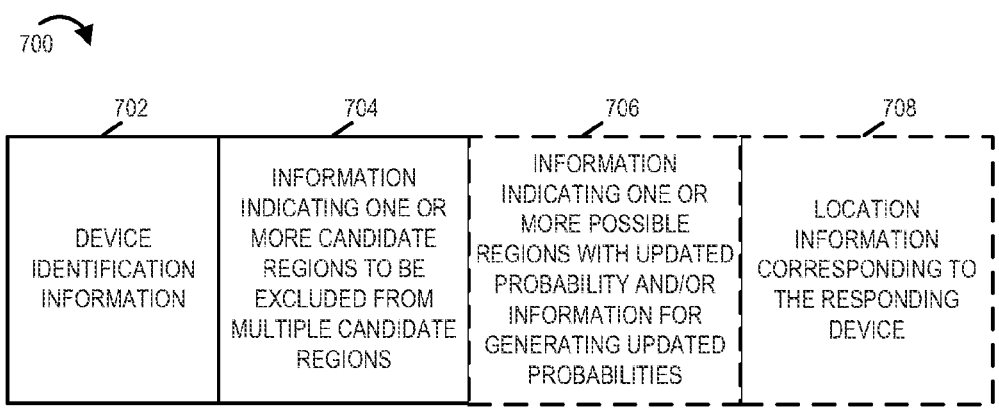
FIG. 7 illustrates an exemplary ambiguity resolution request response signal including various exemplary fields of information, in accordance with an exemplary embodiment.

FIG. 7 illustrates an exemplary response signal 700 including various exemplary fields of information, in accordance with an exemplary embodiment. Exemplary response signal 700 is communicated by a communications device, e.g., mobile device 3 106, in response to the ambiguity resolution request signal 600. In various embodiments a responding communications device sending the response signal 700 evaluates, prior to responding, whether or not it is in a position to help a mobile device such as the first mobile device 1 102 seeking to resolve location ambiguity. Thus in various embodiments the responding communications device sending the response signal 700 is at least aware of its own location to a certain degree of accuracy. The responding communications devices transmitting the response signal 700 include mobile communications devices in addition to access points in the system 100, however for the purpose of discussion, consider that mobile device 3 106 is the responding communications device. In general, the response signal 700 includes information sufficient for the first mobile device 1 102 which sent the ambiguity resolution request signal 600, to exclude out one or more candidate regions where the first mobile device 1 102 could be located.

The exemplary request response signal 700 includes device identification information field 702, an information field 704 indicating candidate regions which can be excluded, an optional information field 706 indicating one or more candidate regions with updated probability, and an optional information field 708 indicating the location of the responding communications device 3 106. The optional information fields may be included in the response signal 700 in some embodiments. The optional information fields 706, 708 are indicted using dashed boxes.

The first field 702 includes identification information identifying the communications device which is sending the response signal, e.g., mobile device 3 106, in response to an ambiguity resolution request signal 600. The identification information may include, e.g., a device identifier corresponding to the responding communications device, a network assigned identifier etc.

Information field 704 includes information indicating one or more candidate regions which can be excluded from multiple candidate regions. The one or more candidate regions indicated in the information field 704 may be a subset of the multiple candidate regions where the first mobile device 1 102 could be located, indicated in the ambiguity resolution request signal 600 sent by the first mobile device 1 102. Thus in response signal 700 the responding mobile device 3 106 provides information indicating one or more candidate regions which can be excluded as not being valid candidate regions. For example, consider the previous example where the first mobile device 1 102 transmitting the ambiguity resolution request signal 600 is inside a building. The first mobile device 1 102 indicates in the ambiguity resolution request signal 600 that candidate region 1 is the 1st floor level, candidate region 2 is the 2nd floor, and candidate region 3 is the 4th floor, then after performing measurements the responding mobile communications device 3 106 may indicate in field 704 that that the 2nd floor level and the 4th floor level are not valid candidate regions and can be excluded.

Information field 706 is optional, and includes information indicating one or more candidate regions along with an updated probability corresponding to each of the one or more regions, calculated by the responding mobile communications device 3 106. In one embodiment rather than the updated probabilities, the information field 706 includes information which can be used by the first mobile device 1 102 receiving the response signal 700 to generate updated probabilities corresponding to one or more candidate regions. The one or more candidate regions indicated in the information field 706 may be a subset of the multiple candidate regions where the first mobile device 1 102 could be located, indicated in the ambiguity resolution request signal 600 sent by the first mobile device 1 102. Thus in some embodiments the response signal 700 includes updated probabilities of one or more candidate regions where the first mobile device 1 102 could be located. The updated probabilities reflect the degree of certainty of the location of the first mobile device 1 102 from the stand point of the responding communications device 3 106. Thus the first device 1 102 can use the updated probabilities indicated in field 706 in making a more informed and accurate decision regarding the candidate region (out of a plurality of candidate regions) where it is located.

Information field 708 includes location information corresponding to the responding communications device, e.g., mobile device 3 106. In some embodiments the information field 708 further includes an indication of the degree of certainty corresponding to the indicated location of the mobile device 3 106. The location information in field 708 may, and in some embodiments is, used by the first mobile device 1 102 in disambiguating or resolving the location ambiguity of the first mobile device 1 102. The location information corresponding to the responding mobile device 3 106 may be used by the first mobile device 1 102 in various possible ways. For example in some embodiments, using the knowledge of the location of the responding mobile device 3 106 and by measuring signal power level of the received response signal 700, the first mobile device 1 102 is able to determine its own location and/or at least resolve its candidate region ambiguity, e.g., by applying signal measurement and fingerprint prediction maps based location determination techniques. Although not shown in the embodiment of FIG. 7, in some embodiments the response signal includes information indicating the location of other mobile devices, e.g., other peer to peer devices, discovered by the responding device. In some embodiments the response signal 700 is a timing signal for round trip time (RTT) estimation. In some embodiments the response signal 700 is one of a directed peer to peer traffic signal, a broadcast signal or a query response signal.

In accordance with one feature of some embodiments, device location related ambiguity, e.g., uncertainty between which of a plurality of possible device locations is the actual current location of a mobile device, can be resolved by communicating with another wireless mobile or fixed device in order to perform an auxiliary positioning operation. However sometimes it may be that such a function is deemed too costly e.g., in terms of battery life and communication overhead, for routine usage but is used by the mobile device when there is a high level of ambiguity between possible locations or regions where the mobile device is possibly located, e.g., a level of uncertainty above a predetermined threshold. In various embodiments, a mobile communications device attempting to determine its location initiates an auxiliary, active positioning ambiguity resolution operation, in cases where the level of uncertainty with regard to a determined device location is unacceptably high, e.g., exceeds a predetermined reliability threshold.

The auxiliary positioning operation performed may depend on the specific ambiguity needing resolution and may involve broadcasting of information about the ambiguity for use by other devices which may provide information to help resolve the ambiguity. Such a targeted operation is generally more efficient than unconditioned positioning operations. In various embodiments the broadcast information includes information identifying the device seeking location ambiguity information resolution. In addition the broadcast information may include possible locations which the device believes it may be located at and, in some embodiments, an indication of a degree of certainty corresponding to the possible location. By broadcasting the information rather than addressing or communicating it to a specific device, resources can be conserved since multiple transmissions to individual devices need not occur and devices who hear the broadcast message are free to respond if they believe they can help resolve the ambiguity. Devices without useful information may remain silent. Responding devices may include other mobile devices in addition to access points.

A response may include information sufficient for the device sending the request to exclude out one or more candidate regions. For example, a device receiving an ambiguity resolution request signal indicating first floor and third floor levels inside a building as its possible location regions might respond by indicating that first floor is a correct location region or indicating that third floor is not a valid possible region. The responding device may be able to make such a determination based on knowledge of its own location and the fact that the device which sent the ambiguity resolution request is within broadcast range of the responding device.

In one embodiment, the auxiliary positioning operation is round-trip-time (RTT) estimation with respect to another device whose location is currently known or discovered. For instance, if the mobile device seeking to resolve location ambiguity determines that the mobile is in a corridor but is unsure of where exactly, the RTT estimation can be used with respect to an anchor point which is in that corridor because there is a high probability that line-of-sight exists between the mobile device and the anchor point thus ensuring that accurate distance estimation is possible.

In one embodiment, the normal or standard positioning process is implemented by the mobile device and the mobile device itself (or the positioning application) may trigger the auxiliary positioning operation when it determined that there is a position ambiguity, e.g., uncertainty with regard to the location of the device to within a predetermined or desired distance. In another embodiment, the normal or standard positioning process for the mobile device may be implemented by a network device in which case the network device may trigger the auxiliary positioning function by communicating with the mobile device itself and/or other mobile devices in the area. In either case, the auxiliary positioning operation may be a request for communication of information between multiple peers in the network and/or between the peers and a network device where the information is such that it can either resolves the ambiguity and/or can be used to improve the mobile devices understanding/determination of its location.

In some embodiments, the mobile device (or the network device, in case the nominal positioning is performed by the network device) transmits an ambiguity resolution request signal directly to a discovered peer or another network device, or broadcasts it as a query to any peer in the broadcast coverage area that might be listening. The peers that are selected or that receive the query signal may then respond with a signal that helps in resolving the position ambiguity of the mobile.

In one embodiment, the signal transmitted by the responding peer includes the peer's position information which may then be used to disambiguate the request sending mobile device's position. A signal-fingerprint map, e.g., RF or other type of signal prediction map, based positioning process may be applied on the signal received from the responding peer.

In another embodiment, the resolution request signal includes information about the mobile device's position ambiguity, such as a summary of the candidate positions and their associated probabilities. The peers that receive the request signal and that are able to sufficiently skew the probabilities in favor of one (or a subset) of the candidate positions will then respond with information, e.g., information about the device's location, an updated probability value and/or other information which can be used to improve the estimate of the device's location such as a parameter used in making a location prediction.

In some embodiments the ambiguity resolution request signal is one of a dedicated peer traffic signal, a broadcast signal or a query signal. The information included in the peer response signal may be a timing signal for RTT, peer position information or the positions of other peers discovered by the responding peer. In some embodiments the peer response signal is a dedicated peer traffic signal, a broadcast signal or a query-response signal.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to a non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, generating, processing, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more above described methods.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first mobile device, comprising:
   determining that a level of ambiguity with regard to which one of a plurality of candidate regions includes the location of the first mobile device exceeds a threshold;
   generating, in response to said level of ambiguity exceeding said threshold, an ambiguity resolution request signal, wherein the ambiguity resolution request signal includes information identifying said first mobile device and multiple candidate regions;
   transmitting the ambiguity resolution request signal;
   removing at least one candidate region from the plurality of candidate regions based on a response signal which is in response to said transmitted ambiguity resolution request signal; and
   determining the location of the first mobile device in a candidate region remaining in the plurality of candidate regions after removing said at least one candidate region.

2. The method of claim 1, further comprising:
   determining a set of candidate regions where the first mobile device could be located, said set of candidate regions being said plurality of candidate regions.

3. The method of claim 1, further comprising:
   receiving said response signal in response to said transmitted ambiguity resolution request signal.

4. The method of claim 1, further comprising:
generating a probability level for each of multiple candidate regions in said plurality of candidate regions, each determined probability corresponding to a single candidate region; and
determining said level of ambiguity with regard to which one of said plurality of candidate regions includes the location of the first mobile communications device from at least one of the generated probability levels.

5. The method of claim 1, wherein said multiple candidate regions are a subset of the plurality of candidate regions for which a level of ambiguity exceeds a threshold.

6. The method of claim 1, wherein said transmitted ambiguity resolution request signal further includes information indicating for at least one of said multiple candidate regions, a level of probability that said one of the candidate regions includes the location of said first mobile device.

7. The method of claim 1, further comprising:
receiving an ambiguity resolution request signal from a second mobile communications device; and
transmitting location related information indicating that at least one candidate region being considered by said second mobile communications device is not the location at which said second mobile communications device is located.

8. A first mobile device, comprising:
means for determining that a level of ambiguity with regard to which one of a plurality of candidate regions includes the location of the first mobile device exceeds a threshold;
means for generating an ambiguity resolution request signal, in response to said level of ambiguity exceeding said threshold, wherein the ambiguity resolution request signal includes information identifying said first mobile device and multiple candidate regions;
means for transmitting the ambiguity resolution request signal;
means for removing at least one candidate region from the plurality of candidate regions based on a response signal which is in response to said transmitted ambiguity resolution request signal; and
means for determining the location of the first mobile device in a candidate region remaining in the plurality of candidate regions after removing said at least one candidate region.

9. The first mobile device of claim 8, further comprising:
means for determining a set of candidate regions where the first mobile device could be located, said set of candidate regions being said plurality of candidate regions.

10. The first mobile device of claim 8, further comprising:
means for receiving said response signal in response to said transmitted ambiguity resolution request signal.

11. The first mobile device of claim 8, further comprising:
means for generating a probability level for each of multiple candidate regions in said plurality of candidate regions, each determined probability corresponding to a single candidate region; and
means for determining said level of ambiguity with regard to which one of said plurality of candidate regions includes the location of the first mobile communications device from at least one of the generated probability levels.

12. The first mobile device of claim 8, wherein said multiple candidate regions are a subset of the plurality of candidate regions for which a level of ambiguity exceeds a threshold.

13. The first mobile device of claim 8, wherein said transmitted ambiguity resolution request signal further includes information indicating for at least one of said multiple candidate regions, a level of probability that said one of the candidate regions includes the location of said first mobile device.

14. The first mobile device of 8, further comprising:
means for receiving an ambiguity resolution request signal from a second mobile communications device; and
means for transmitting location related information indicating that at least one candidate region being considered by said second mobile communications device is not the location at which said second mobile communications device is located.

15. A first mobile device, comprising:
at least one processor configured to:
determine that a level of ambiguity with regard to which one of a plurality of candidate regions includes the location of the first mobile device exceeds a threshold;
generate an ambiguity resolution request signal, in response to said level of ambiguity exceeding said threshold, wherein the ambiguity resolution request signal includes information identifying said first mobile device and multiple candidate regions;
transmit the ambiguity resolution request signal;
remove at least one candidate region from the plurality of candidate regions based on a response signal which is in response to said transmitted ambiguity resolution request signal; and
determine the location of the first mobile device in a candidate region remaining in the plurality of candidate regions after removing said at least one candidate region; and
a memory coupled to said at least one processor.

16. The first mobile device of claim 15, wherein said at least one processor is further configured to:
determine a set of candidate regions where the first mobile device could be located, said set of candidate regions being said plurality of candidate regions.

17. The first mobile device of claim 15, wherein said at least one processor is further configured to:
receive said response signal in response to said transmitted ambiguity resolution request signal.

18. The first mobile device of claim 15, wherein said at least one processor is further configured to:
generate a probability level for each of multiple candidate regions in said plurality of candidate regions, each determined probability corresponding to a single candidate region; and
determine said level of ambiguity with regard to which one of said plurality of candidate regions includes the location of the first mobile communications device from at least one of the generated probability levels.

19. The first mobile device of claim 15, wherein said at least one processor is further configured to:
receive an ambiguity resolution request signal from a second mobile communications device; and
transmit location related information indicating that at least one candidate region being considered by said second mobile communications device is not the location at which said second mobile communications device is located.

20. A computer program product for use in a first mobile device, comprising:
non-transitory computer readable medium comprising:
code for causing at least one computer to determine that a level of ambiguity with regard to which one of a plurality of candidate regions includes the location of the first mobile device exceeds a threshold;

code for causing the at least one computer to generate an ambiguity resolution request signal, in response to said level of ambiguity exceeding said threshold, wherein the ambiguity resolution request signal includes information identifying said first mobile device and multiple candidate regions;

code for causing the at least one computer to transmit the ambiguity resolution request signal;

code for causing the at least one computer to remove at least one candidate region from the plurality of candidate regions based on a response signal which is in response to said transmitted ambiguity resolution request signal; and code for causing the at least one computer to determine the location of the first mobile device in a candidate region remaining in the plurality of candidate regions after removing said at least one candidate region.

* * * * *